UNITED STATES PATENT OFFICE.

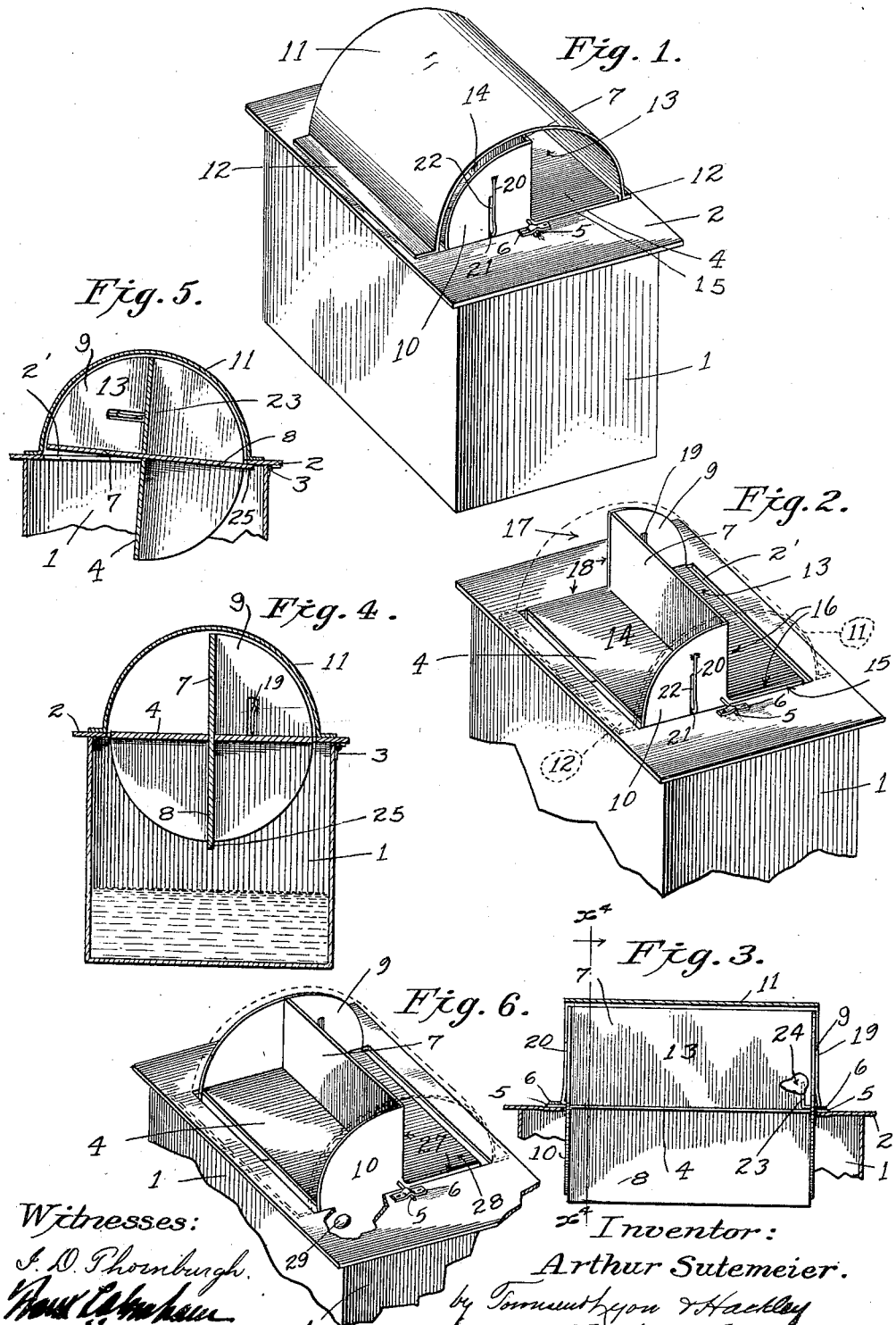

ARTHUR SUTEMEIER, OF AVALON, CALIFORNIA.

ANIMAL-TRAP.

1,006,701.  Specification of Letters Patent.  Patented Oct. 24, 1911.

Application filed December 5, 1910. Serial No. 595,804.

*To all whom it may concern:*

Be it known that I, ARTHUR SUTEMEIER, a citizen of the United States, residing at Avalon, in the county of Los Angeles and State of California, have invented a new and useful Animal-Trap, of which the following is a specification.

This invention relates to animal traps, and particularly to that class of trap in which the animal may be taken alive if so desired, and one of the main objects of the present invention is to produce a trap of the class described which is self-resetting and in which a plurality of captures may be made without the necessity of inspection or manual re-setting of the trap.

Another object of the invention is to produce a device of the character described of economical and simple construction, and of simple operation, adapted for trapping various kinds of animals without change in construction.

Other objects and advantages will appear hereinafter from the following description.

Referring to the drawings which are for illustrative purposes only: Figure 1 is a perspective view of a trap embodying my invention. Fig. 2 is a perspective view similar to Fig. 1, in which the cover plate is shown in dotted lines. Fig. 3 is a longitudinal section of the trap partly in elevation. Fig. 4 is a transverse sectional view of the trap on line $x^4$—$x^4$ Fig. 3. Fig. 5 is a transverse sectional view similar to Fig. 4, showing the trap in tilted position. Fig. 6 is a perspective view, similar to Fig. 2, showing a modified form of the invention.

1 designates a tank or receptacle, made of sheet metal or other suitable material, having a lid or cover plate 2 hinged thereto, as indicated at 3. Lying in the same plane with the lid 2, in a central opening 2' in the lid, is a platform 4 pivoted at each end to the lid 2 by means of pins 5, revolubly mounted in bearing-plates 6. Extending upwardly at right angles thereto, longitudinally of the platform 4 is a division wall 7, a similar wall extending downwardly from the underside of the platform. At each end of the platform 4 are end plates 9 and 10 respectively, circular in form and forming closures as hereinafter described. Arched over the tilting platform, division wall 7 and end-plates 9 and 10, is a semi-cylindrical cover 11 having its lower edges flanged outwardly as indicated at 12, and secured to the top 2 in any suitable manner. The platform 4, end-plates 9 and 10, wall 7 and cover 11 form two chambers 13 and 14 respectively, chamber 13 having an entrance or opening at 15, formed by cutting away a portion of the end-plate 10 as indicated at 16, chamber 14 having an entrance or opening 17 formed by cutting away the end-plate 9 as indicated at 18. The platform 4 is held in the same plane as the lid 2 and level therewith, by means of spring-detents 19 and 20, secured at their upper ends to the end-plates 9 and 10 respectively, in any suitable manner, as by soldering. Each detent 19 and 20 has a bent portion or shoulder 21 which rests upon the top of the lid 2. The end of each detent 19 and 20 extends through a slot 22 into the adjacent chamber and is bent upwardly forming a hook 23 upon which may be placed any suitable bait as indicated at 24.

The device is operated in the following manner: The animal entering one of the chambers 13 or 14, through the respective entrance openings 15 and 17, walks upon the tilting platform 4, and upon grasping the bait, pulls the same, thereby pulling the spring-detent 19 or 20 as the case may be, inwardly, releasing the same from engagement with the lid 2. The weight of the animal then causes the revoluble platform 4 upon which the animal is resting to revolve about the pivots 5 into the position indicated in Fig. 5, dropping the animal from the platform into the box or tank 1. After the animal has fallen from the platform 4 into the tank 1, the platform returns to its original position, due to the fact that the greater part of the weigh of the end-plates 9 and 10 lies below the pivots 5. The movement of the platform 4 downwardly by the weight of the animal on the platform is limited by an extension 25 of the wall 8 which engages the underside of the lid 2 as clearly shown in Fig. 5. The trapped animals are removed from the tank 1 by lifting the lid 2, thereby giving access to the interior of the tank.

The trap constructed as above described and illustrated in Figs. 1 to 5 inclusive, is double in form, having two chambers 13 and 14 into either of which the animal may enter, the platform 4 being free to revolve in either direction, depending upon the side upon which the animal may enter. In the form shown in Fig. 6, the end-plate 9 is circular in form closing one end of each chamber. The end-piece 10 is cut away as indicated at 27, forming a single entrance 28 to the trap. In this construction, it is preferable to add a weight 29 to the end-plate 10, below the pivotal point so as to insure a return of the platform 4 to its original position after having been tilted to deliver the animal trapped into the receptacle or tank 1. If it is desired, water may be placed within the tank 1 and the animal dropped therein, which would be the plan followed in trapping rats or similar animals, thereby drowning the animals as soon as trapped.

In my invention with the device constructed as above, the animal entering the trap remains there but a short space of time and upon tackling the bait, is immediately dropped into the tank or box 1, the animal not having had time to fight or leave any evidences of his visit to the trap as is usually found in traps of other constructions.

What I claim is:

1. An animal trap comprising a receptacle, a lid on said receptacle having an opening therein, a platform in said opening revolubly mounted on said lid, a wall extending longitudinally through the center of said platform, a semi-cylindrical cover over said platform, end plates on said platform forming end closures, one of said end plates having a cut-away portion to form an entrance to said platform, and bait receiving means carried on the end plate opposite the opening in the other end plate forming a releasable retaining means for said platform.

2. An animal trap comprising a receptacle, a lid on said receptacle having an opening therein, a platform in said opening revolubly mounted on said lid, an upper and lower wall extending longitudinally through the center of said platform, a semi-cylindrical cover over said platform above said upper wall, circular end plates at each end of said platform, each of said end plates having a cut-away portion at opposite sides of said receiving means forming a releasable of said upper wall to form separate entrances to said platform, and bait receiving means forming a releasable retaining means for said platform.

3. An animal trap comprising a receptacle, a lid on said receptacle having an opening therein, a platform in said opening revolubly mounted on said lid, an upper and lower wall extending longitudinally through the center of said platform, an extension on said lower wall adapted to strike the under side of said lid and limit the revoluble movement of said platform, a semi-cylindrical cover over said platform above said upper wall, circular end plates at each end of said platform, each of said end plates having a cut-away portion at opposite sides of said upper wall to form separate entrances to said platform, and bait receiving means forming a releasable retaining means for said platform.

In testimony whereof, I have hereunto set my hand at Avalon, Cal., this 26th day of November, 1910.

ARTHUR SUTEMEIER.

In presence of—
PETER J. VINCH,
C. B. PARKER.

---

Copies of this patent may be obtained for five cents each, by addressing the "Commissioner of Patents, Washington, D. C."